April 3, 1962  C. L. KLASING, JR  3,027,985
SEALED NON-SPIN HAND BRAKE MECHANISM
Filed Nov. 2, 1959  3 Sheets-Sheet 1
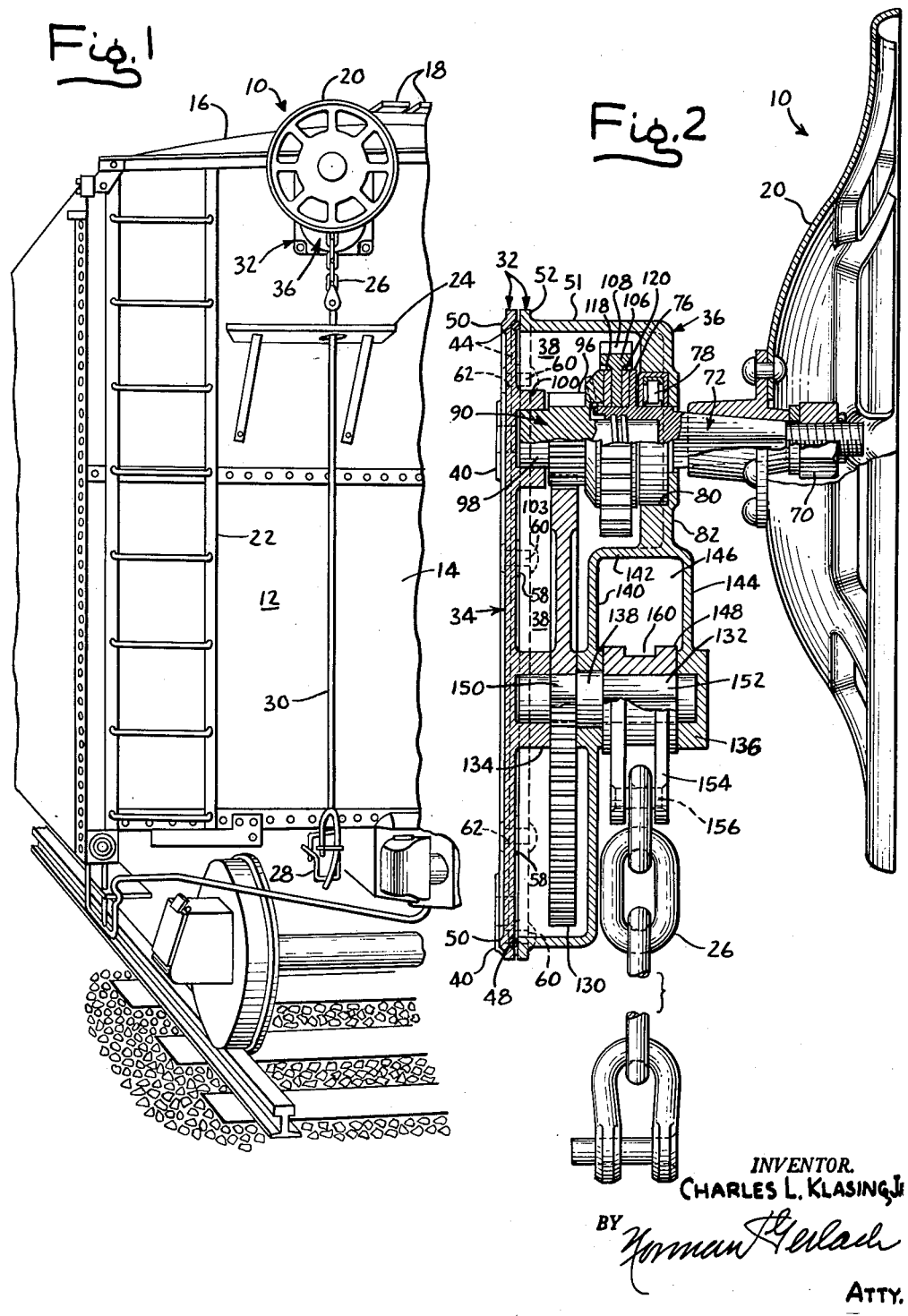
INVENTOR.
CHARLES L. KLASING Jr
BY Norman H Gerlach
ATTY.

April 3, 1962  C. L. KLASING, JR  3,027,985
SEALED NON-SPIN HAND BRAKE MECHANISM
Filed Nov. 2, 1959  3 Sheets-Sheet 2

INVENTOR
CHARLES L. KLASING, JR.
by: *Norman Gerlach*
ATTY.

April 3, 1962 C. L. KLASING, JR 3,027,985

SEALED NON-SPIN HAND BRAKE MECHANISM

Filed Nov. 2, 1959 3 Sheets-Sheet 3

INVENTOR
CHARLES L. KLASING, JR.

by: Norman Gerlach

ATTY.

United States Patent Office  3,027,985
Patented Apr. 3, 1962

3,027,985
SEALED NON-SPIN HAND BRAKE MECHANISM
Charles L. Klasing, Jr., Joliet, Ill., assignor to Klasing Hand Brake Co., Joliet, Ill., a corporation of Illinois
Filed Nov. 2, 1959, Ser. No. 850,390
7 Claims. (Cl. 192—16)

The present invention relates to hand brake mechanisms for railway cars and has particular reference to a sealed hand brake mechanism of the non-spin type wherein provision is made for release of the brake mechanism without the application of such counter-torque to the hand brake wheel as to cause spinning of the latter.

A hand brake mechanism of this general character is shown and described in United States Patent No. 2,954,107 granted on September 27, 1960, and entitled "Sealed Non-Spin Hand Brake Mechanism," over which mechanism the present one is an improvement.

One of the principal limitations that are attendant upon the use of conventional present-day hand brake mechanisms resides in the exposed nature of the winding drum and of the gearing, clutch devices and other power train instrumentalities which extend from the hand wheel to the winding drum. These devices are invariably exposed in conventional hand brake assemblies and their exposure is a hazard in that the clothing of the brakeman or other brake-operating personnel is subject to entanglement with the mechanism during release of the brake. Because of the exposure of such gearing, clutch devices and the like, no provision is made for lubricating the same and, except for any lubrication which may be given the parts at the factory during the initial manufacture and assembly of the mechanism, such parts remain unattended throughout their entire period of use. Such parts are, therefore, subject to excessive wear, while at the same time exposure of the various parts is conducive toward corrosion, oxidation or other deterioration in time.

The hand brake mechanism shown and described in my co-pending application, above referred to, as well as the present hand brake mechanism, are designed to overcome the above-noted limitations that are attendant upon the construction and use of conventional mechanisms designed for the same purpose, both mechanisms being of the non-spin type and wherein the entire power train extending from the hand wheel to the winding drum shaft is completely sealed within the hand brake housing and wherein the sealed housing is packed with a suitable lubricant, the sealing and packing of the mechanism being a permanent one so that no further thought to lubrication need be given the installation during the entire life thereof. By thus sealing the moving parts of the brake mechanism, contact therewith by a person, by the clothing of a person, by tools in the hand of the person, or by foreign objects is rendered impossible. Additionally, such sealing of the mechanism will prevent dirt, dust or other foreign matter from entering the hand brake housing while at the same time the mechanism is protected from moisture during inclement weather or conditions of high humidity. The improvement which the present invention exhibits over the sealed mechanism of my co-pending application, above referred to, resides in the elimination of an appreciable amount of gearing, i.e., a shortening of the power train which extends from the hand wheel shaft to the winding drum shaft, while at the same time preserving substantially the same mode of operation of the apparatus. Stated in other words, it is an object of the present invention to provide a sealed hand brake mechanism which, although it consists of fewer parts, will respond to the hand wheel manipulations of the operator in substantially the same manner and with substantially the same results as the hand wheel mechanism of my co-pending application.

The general objects of the present invention are thus substantially the same as set forth in my co-pending application, namely to provide a novel form of mechanism wherein a very small arc of movement of the hand wheel will permit partial release of the brake mechanism and wherein complete release from full brake application may be effected by a relatively small degree of turning movement of the hand wheel.

It is another specific object of the invention to provide a hand wheel brake mechanism of this general character having associated therewith a novel form of compound clutch assembly which is extremely sensitive to hand wheel control operations and which will enable the operator to effect a controlled graduated application of the brake mechanism, as well as a controlled graduated release thereof, whereby speed control operations which heretofore have been either unattainable or difficult to attain, are capable of being effected with a minimum of effort on the part of the operator.

Another object of the invention is to provide a hand brake mechanism for railway car use having a braking factor which meets A.A.R. requirements, yet which at no time during its operation requires more than a few pounds of torque application to the rim of the hand wheel by the operator.

Convenience of arrangement of parts, simplicity of construction, economy of manufacture, ruggedness and durability, and smoothness and silence of operation, are further desirable features which have been borne in mind in the production and development of the present invention.

With these and other objects in view which will become more readily apparent as the following description ensues, the invention consists of the novel construction, combination and arrangement of parts shown in the accompaying three sheets of drawings forming a part of this specification.

In these drawings:

FIG. 1 is a fragmentary end elevational view of a railway car showing a non-spin hand brake assembly constructed in accordance with the principles of the present invention operatively applied thereto;

FIG. 2 is a vertical sectional view taken substantially centrally and tranversely through that portion of the hand brake assembly of FIG. 1 which embodies the present invention, the position of the mechanism corresponding to a released position of the car brake shoes;

Figure 3:
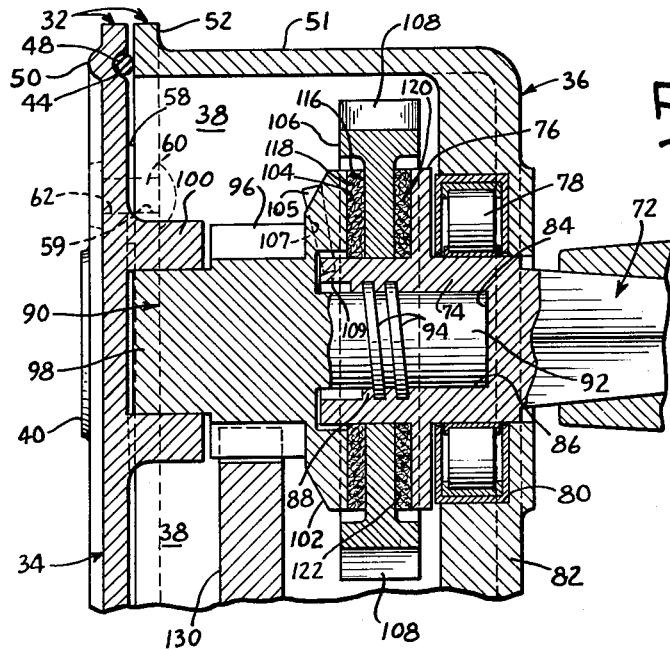
FIG. 3 is an enlarged fragmentary sectional view showing a portion of the structure of FIG. 2 with the brake mechanism in a position corresponding to the braking, or set position of the car brake shoes.

Referring now to the drawings in detail and in particular to FIG. 1 wherein a typical installation of a hand brake assembly constructed in accordance with the principles of the present invention has been illustrated, the hand brake assembly is designated in its entirety at 10 and is shown as being operatively installed on one end of a railway car 12. In the installation shown, the assembly 10 is operatively applied to one end wall 14 of the railway car 12 exteriorly thereof adjacent the roof portion 16 immediately below the catwalk 18 and the operating hand wheel 20 associated with the assembly is conveniently positioned so that it may be operated by the brakeman or other train personnel with the operator being supported by one foot on the usual ladder 22 and by the other foot on a platform 24 positioned an appropriate distance beneath the assembly 10. Connection between the output or tensioning chain 26 of the assembly 10 and the input rocker segment or bell crank 28 of the brake shoe actuating mechanism beneath the railway car 12 is effected by a vertical tie rod or link 30 in the usual manner of operation of such systems.

In FIG. 2 of the drawings, the position of the mechanism corresponds to the released position of the brake shoes (not shown herein) which are operable under the control of the bell crank 28. The assembly involves in its general organization a two-piece housing 32 including a rear or base casting 34 and a front or cover casting 36. The two castings 34 and 36 are adapted to be permanently secured together in a manner that will be set forth presently so that they provide an internal lubricant or grease-retaining chamber 38 therebetween and in which the operative brake tensioning instrumentalities of the present invention are enclosed.

Figure 5:
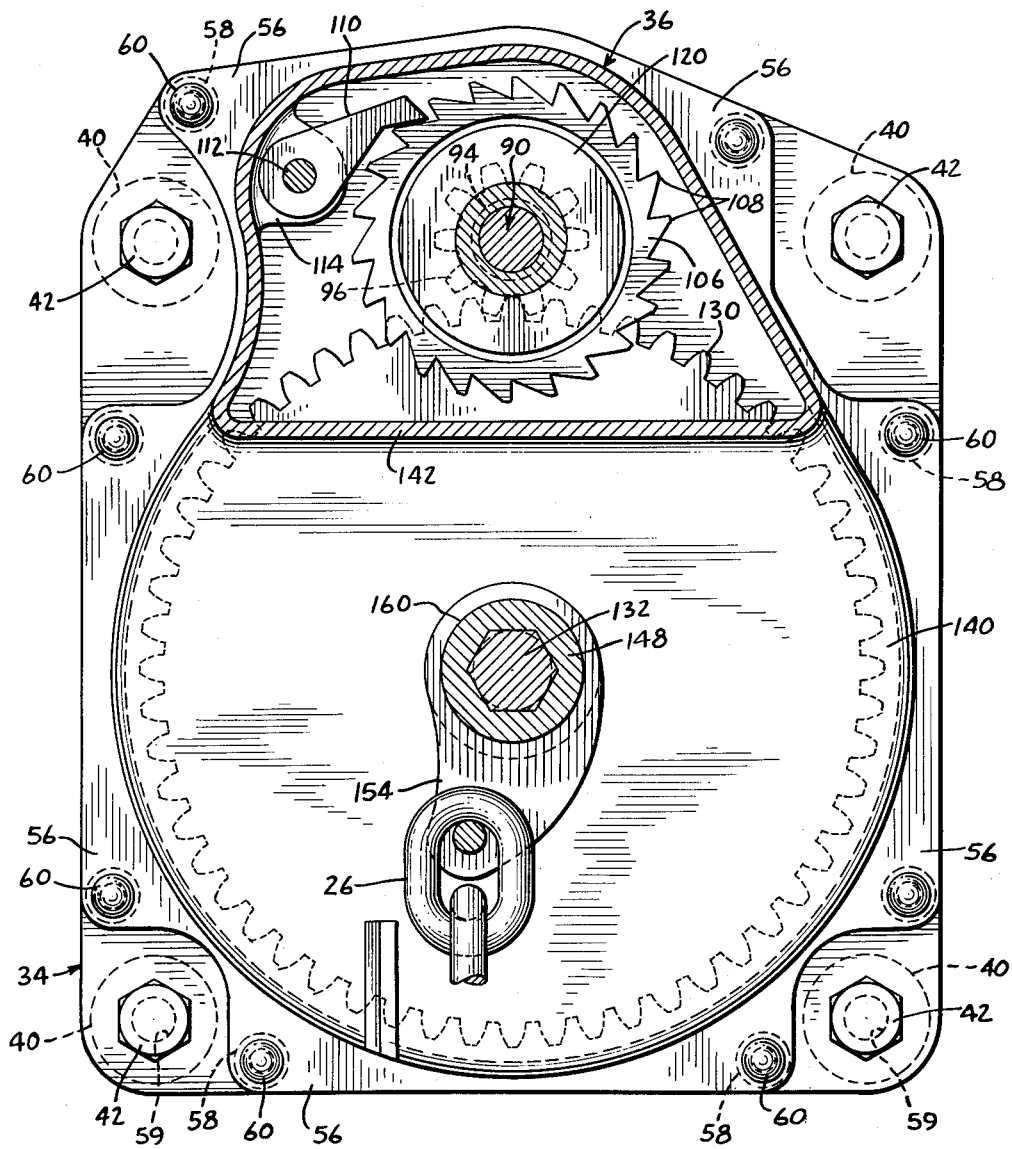
FIG. 5 is a sectional view taken substantially along the line 5—5 of FIG. 2 with the parts in a condition of brake application.

As best seen in FIG. 5, the base casting 34 is in the form of a generally rectangular plate having a curved lower edge. Adjacent each corner of the plate there is provided a rearwardly extending outside circular boss 40. A fastening bolt 42 extends through each boss 40 and the various bolts serve to secure the base casting 34 in position on the railway car end wall 14 in the vertical relationship in which it is shown in FIG. 1. A continuous groove 44 extends around the marginal regions of the rectangular and generally flat base casting 34 and receives therein a sealing strip 46. The metal of the plate 34 in the vicinity of the groove 44 is reinforced by the provision of an external rib 50 on the outside of the casting. The front casting 36 is of cup-shape design and the marginal contour thereof corresponds generally to the shape of the groove 44. The cover casting 36 is formed with a marginal wall 51, presenting a relatively narrow, outwardly extending, continuous lateral flange 52, the forward face of which registers with the groove 44 so that when the two castings 34 and 36 are operatively assembled upon each other, the sealing strip 48, which may be of rubber, either natural or synthetic or a rubber substitute, may be compressed between the two castings in such a manner as to fill groove 44 and effect a permanent seal between the castings. The lateral flange 52 is formed with a series of spaced marginal ears 56, each presenting a raised boss 58 having a hole 59 extending centrally therethrough. A rivet or similar fastener 60 extends through each hole 59 and through a registering hole 62 formed in the base casting 34 and the various rivets serve permanently to secure the front casting in position on the rear casting or base plate with the sealing strip 48 being compressed into sealing engagement with the two sections of the housing.

The hand wheel 20 is of conventional design and it is affixed by means of a nut 70 to the outer or exposed end of a rotatable operating shaft 72. The shaft 72 is provided with an enlarged base or hub portion 74 from the central regions of which there extends a radial clutch reaction flange 76. The forward region of the hub portion 74 is rotatably journalled in an anti-friction roller bearing assembly 78 nested within a recess 80 provided internally on the front wall 82 of the front casing section 36. The inner or rear end of the hub portion 74 of the hand wheel shaft 72 is formed with a relatively deep, generally cylindrical socket 84 having a truly cylindrical wall portion 86 and an internally threaded cylindrical portion 88 near the rim of the socket, the threads being of the square type.

A clutch shaft 90 is provided with a reduced forward end or pilot stem 92 which extends into the socket 84 and which is piloted in the cylindrical portion 86 of the socket. This reduced forward end 92 of the clutch shaft 90 is provided with a threaded portion 94, likewise involving square threads, and which is threadedly received within the internally threaded portion of the socket 84. The clutch shaft 90 is formed with a medially disposed clutch pinion 96. The extreme rear end region of the clutch shaft is provided with a pilot stem 98 which extends into an internal circular boss 100 formed on the front or inside face of the base casting 34. The clutch shaft is thus supported between the boss 100 and socket 84.

Immediately forwardly of the pinion 96, the clutch shaft 90 is provided with a radial flange 102 presenting a forwardly facing clutch face 104. The flange 102 thus serves the function of a clutch plate. A taper pin 105 is driven through a substantially radially extending bore 107 provided in the flange 102 and the inner end of the pin 105 is designed for engagement with a limit stop or abutment 109 formed on the rim of the socket 84. The pin 105 and abutment 109 thus provide interengaging means between the two shafts 72 and 90 which prevents forceful bottoming, so to speak, of the forward end of the shaft 90 against the bottom wall of the socket 84, or bottoming of the rear end of the shaft 72 against the shoulder at the base of the pilot stem 92. Such interengaging means thus serves to prevent frictional binding of the two shafts.

The hub portion 74 of the clutch shaft 90 has telescopically received thereover a ratchet wheel 106 having ratchet teeth 108 thereon designed for cooperation with a pivoted pawl 110. The pawl 110 is pivotally mounted on a pin 112 supported between a pair of spaced internal webs 114 formed on the inside face of the continuous marginal wall of the casting 36.

Interposed between the forward face 104 of the flange 102 and the rear face 116 of the ratchet wheel 106 is a clutch friction disk 118. A similar clutch friction disk 120 is interposed between the rear face 122 of the radial flange 76 and the front face of the ratchet wheel 106. The two friction disks 118 and 120, as well as the ratchet wheel 106, are loosely and telescopically received over the rear end region of the hub 74 of the hand wheel shaft 72. The two friction disks and ratchet wheel are thus capable of limited axial sliding movement on the hand wheel shaft 72 so that when the hand wheel 20 is rotated manually in a clockwise direction as viewed in FIG. 4 to increase the extent of threaded engagement between the mating threaded ends of the two shafts 72 and 90, the friction disks and their interposed ratchet wheel will be compressed as a unit between the friction faces 104 and 122 in such a manner that the various friction surfaces afforded on the opposite sides of the friction disks and on the opposite sides of the ratchet wheel will be locked together so that the entire clutch assembly, including the clutch shaft 90, will become locked up and will thus rotate bodily with the hand wheel shaft 72.

The clutch pinion 96 is of relatively small size and it meshes with a relatively large main winding or spur gear 130 which is mounted on and is rotatable bodily with a drum shaft 132, the opposite ends of the latter being rotatably journalled in circular bosses 134 and 136, respectively, provided on the inside surfaces of the castings 34 and 36. The drum shaft is also journalled medially of its ends as at 138 in an inwardly or rearwardly offset portion 140 of the front wall 82 of the casting 36. A horizontal web 142 connects the offset portion 140 to the front wall proper. The front wall 82 has formed thereon substantially in the plane thereof an apron portion 144 which carries the boss 136 and which also, in combination with the offset portion 144 and web 142, provides a downwardly facing pocket 146 which partially encloses a drum 148. The drum is operatively mounted on the drum shaft 132 and is rotatable bodily with the latter. Both the spur gear 130 and drum 148 are disposed on non-circular, preferably hexagonal, portions 150 and 152, respectively, of the shaft 132 so that these parts are constrained to rotate in unison with the shaft. The drum 148 is formed with a bifurcated crank arm 154 carrying a crank pin 156 which passes through the uppermost link of the chain 26. The lowermost link of the chain is operatively connected to the tie rod or link 30.

Figure 4:
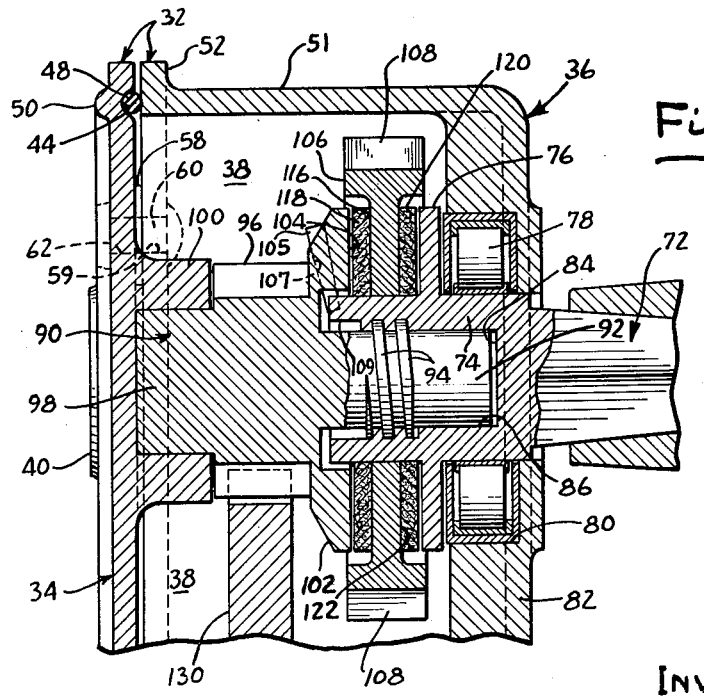
FIG. 4 is a sectional view similar to FIG. 3 showing the various parts in a condition of brake release.

In the operation of the hand brake mechanism, when it is desired to apply the railway car brakes, the hand wheel 20 is rotated manually in a clockwise direction as viewed in FIG. 4. Inasmuch as at that time the chain 26 is unwound from the drum 148 and is, therefore, slack, the clutch assembly, including the ratchet wheel 106 and friction disks 118 and 120, is disengaged and the clutch shaft 90 is backed off, so to speak, on the internally threaded portion 88 of the hand wheel shaft 72 so that the sprocket wheel 106 is unclutched from the shaft 72 on which it is mounted and is free to turn relative thereto. As the hand wheel 20, and consequently, the shaft 72, is gradually turned in such counterclockwise direction, the entire clutch shaft 90, including the clutch pinion 96, is caused to move forwardly, i.e., to the right as viewed in FIGS. 3 and 4, due to the fact that rotational movement of the pinion is restricted by the inertia of the spur gear 130, drum shaft 132, drum 148 and chain 26, as well as by the gravitational and tensional drag applied to the chain by the railway car brake device. Upon such threaded movement of the clutch shaft 90 into the socket portion 84 of the hand wheel shaft 72, the radial flange 102 on the shaft 90 will move toward the right as viewed in FIG. 4, thus forcing the clutch disk 118, sprocket wheel 106 and clutch disk 120 to the right and compressing these three elements hard against the inside face 122 of the clutch reaction flange 76. The entire clutch mechanism is thus caused to become locked up so that the hand wheel shaft 72 and clutch shaft 90 will rotate bodily as a unit, whereupon the pinion 96 will impart counterclockwise motion to the spur gear 130. During such operation of the power train and bodily turning of the entire clutch assembly, the pawl 110 will cooperate with the teeth 108 on the ratchet wheel 106 to prevent reverse rotational movement of the thus locked-up clutch assembly so that as long as an appreciable amount of torque continues to be applied to the hand wheel 20, the clutch mechanism will remain locked up in the manner previously described and a rigid power train will extend from the hand wheel through the hand wheel shaft 72, clutch assembly including the reaction flange 76, disks 118 and 120, ratchet wheel 106 and radial flange 102, pinion 96, and spur gear 130 to the drum shaft 132. As the drum shaft 132 thus rotates, the drum 148 carried thereby will also rotate and the crank pin 156 will move upwardly, thus drawing the chain 26 upwardly with it so as to commence the winding operation of the chain upon the drum. It is to be noted that when the hand wheel is initially rotated in a clockwise direction, the slack in the chain 26 is not immediately taken up due to the fact that the initial rotational movement of the hand wheel shaft 72 is applied to the clutch shaft 90 to produce axial shifting motion thereof under the influence of the threaded connection between the two shafts. This initial rotation of the hand wheel must be continued through a small angle of turning movement sufficient to cause the pressure flange to compress the clutch parts against the clutch reaction flange 76. Thereafter, continued rotation of the hand wheel 20 will serve to overcome the weight of the chain and its associated apparatus so that the slack which is initially present in the chain will be taken up and subsequently the chain will be drawn taut and wound upon the drum 148. During the winding of the chain upon the drum, the chain will be guided onto the drum by the bifurcated crank arm 154 which is in vertical alignment with an annular groove 160 provided in the drum, the groove affording a clearance space for alternate chain links which extend in a plane transverse to the axis of the drum.

At such time as the brake is set, the counter-torque which is applied to the clutch pinion 96 has a tendency to rotate this pinion in a counterclockwise direction as viewed in FIG. 4 which is the direction opposite to that in which it was rotated during application of the brakes. Such a tendency is effective to maintain the clutch assembly tightly locked up so that the pawl 110 will be operative against the entire clutch assembly and not merely against the ratchet wheel 106. As a consequence, the brake will not be released, even if the hand wheel 20 is released by the operator.

The above-described hand brake mechanism may be designed according to practical engineering expediencies so as to produce varying degrees of brake application by the application of different degrees of torque to the drum shaft for a given torque application to the hand wheel 20. For example, the pitch of the threads associated with the internal socket provided in the end of the hand wheel shaft 72 and the respective diameters of the pinion 96 and gear 130, as well as the diameter of the hand wheel itself, may be selected to produce the desired brake action. In practical design, the mechanism will be so constructed as to meet A.A.R. requirements and, in a preferred embodiment, the amount of rotation required of the hand wheel to apply the brakes is very slight so that the brakes may be applied rapidly. It is contemplated that approximately one and one-half turns of the hand wheel will effect complete clutching of the pinion-carrying shaft 90 to the hand wheel shaft 72 and that, thereafter, each quarter turn of the hand wheel will effect increasing increments of pressure to the car brake mechanism. It is further contemplated that an application of approximately 4,000 pounds pressure may be applied to the car brake mechanism when the brakes are set, this pressure being applied at the hand wheel with a power factor ranging between 32 to 1 minimum and 50 to 1 maximum at the air cylinder. Irrespective, however, of the particular gear ratios involved, or the extent of axial movement of the pinion-carrying clutch shaft 90 which is necessary to effect clutch engagement, the essential features of the invention remain substantially the same at all times.

When it is desired to release the brake, it is merely necessary for the operator to rotate the hand wheel 20 in a counterclockwise direction as viewed in FIG. 4 to a slight degree. The extent to which the car brake is released and the speed of its release are entirely under the control of the operator. The operator may release the car brake very gradually by small incremental turns of the wheel 20, or he may release it quickly from full 4,000-pound pressure of brake application to zero brake application by large incremental turns of the hand wheel. In any event, upon initial counterclockwise motion of the hand wheel 20, the hand wheel shaft 72 and clutch shaft 90 will be turned in unison due to the fact that the entire clutch mechanism is locked up with the threaded portions of the two shafts in full threaded engagement. However, due to the fact that the ratchet wheel 106 will, after such initial motion of the hand wheel, be restrained by its cooperating pawl 110, continued counterclockwise rotation of the hand wheel 20 will cause the mating threads on the two shafts to be turned relative to each other so as to back off the clutch shaft, so to speak, and relieve the pressure on the clutch disks 118 and 120 to such an extent that the clutch assembly is no longer fully engaged, but instead, is partially released. Such partial disengagement or loosening of the clutch parts will continue only during actual application of counterclockwise motion to the hand wheel, and immediately upon cessation of the turning motion of the hand wheel, the counter-torque applied through the power train of the hand brake mechanism extending from the chain to the clutch pinion 96, will exert a clockwise torque on the pinion tending again to tighten the threaded connection between the clutch shaft and hand wheel shaft and thus again lock the clutch parts against relative rotation. On the other hand, if the hand wheel 20 has applied thereto relatively large and rapid increments of counterclockwise motion, proportionately large backing off increments of motion will be applied to the clutch pinion 96 and the take-up action described above will lag the unwinding operation so that a more rapid and extensive release of the car brakes will take place.

In the structure disclosed in my co-pending application, above referred to, a gradual release of the car brakes in a manner similar to that described above is attained but, in the present instance, this result is attainable with appreciably less gearing. By means of the present gearing employed, it is possible after a chain unwinding operation has commenced to reapply the brakes immediately by the simple expedient of turning the hand wheel in a clockwise direction without necessitating unwinding of the chain to a condition of complete release. For example, where a railway car is to be allowed to coast along a given length of roadbed and brought to a complete stop at a given point therealong by a gradual slowing down process, the operator will manipulate the hand wheel 20 to turn the same in a clockwise direction and effect the necessary brake action to reduce the speed of the car gradually as the car approaches the point on the roadbed where it is to be stopped. If the operator should underestimate the distance involved and slow down the car too quickly with the consequent danger that if immediate brake release is not effected, the car will be brought to a standstill before it reaches its destination, immediate reversal of the direction of rotation of the hand wheel 20 at any point during winding of the chain 26 on the drum 148 will serve to diminish the extent of threaded engagement between the clutch shaft 90 and the hand wheel shaft 72 due to the holding action of the ratchet and pawl mechanism 106, 110. Continued turning of the hand wheel in this direction will cause small increments of unthreading action to take place between the forward reduced extended portion 92 of the clutch shaft 90 and the threaded wall of the socket 84 formed in the rear end of the hand wheel shaft 72. These small increments of clutch release will effect corresponding increments of brake release but they will take place in opposition to the tightening action afforded by the counter-torque exerted by the chain 26, drum 148, drum shaft 134, spur gear 130 and pinion 96 so that upon any relaxation in the hand wheel loosening action, the clutch mechanism will immediately and automatically become tightened. In this manner, the hand wheel 20 is available to the operator for either graduated brake release or graduated brake application so that the operator will have full control of the speed of movement of the railway car at all times and under wide variety of conditions.

The form of the invention illustrated and described herein is one which has been developed for commercial application and it should be understood that various omissions, substitutions and changes in the form and detail of the apparatus illustrated may be made by those skilled in the art without departing from the spirit of the invention. It is the intention, therefore, to be limited only as indicated by the scope of the following claims.

Having thus described the invention what I claim as new and desire to secure by Letters Patent is:

1. A hand brake mechanism for operating the brake shoes of a railway car, comprising a chain adapted to be operatively connected to said brake shoes, a drum shaft mounted for rotation about a horizontal axis, a drum mounted on said drum shaft and rotatable therewith, said chain passing over said drum in one direction for tightening the brake shoes and in the other direction for releasing said brake shoes, a gear on said drum shaft and rotatable therewith, a hand wheel shaft mounted for rotation about a horizontal axis parallel to and spaced from the drum axis, a hand wheel fixedly secured to said hand wheel shaft, a clutch shaft coaxial with said hand wheel shaft, one end of said hand wheel shaft being provided with an internally threaded socket, one end of the clutch shaft being threadedly received in said socket for limited axial shifting of the clutch shaft relative to the hand wheel shaft upon relative rotation between the hand wheel shaft and clutch shaft, means on said hand wheel shaft and clutch shaft respectively providing a pair of opposed friction surfaces, a ratchet wheel freely rotatable on said hand wheel shaft and interposed between said friction surfaces, friction surfaces on the opposite sides of said ratchet wheel for cooperation with the friction surfaces on the hand wheel shaft and clutch shaft respectively, a pinion on said clutch shaft meshing with said gear on the drum shaft, a pawl cooperating with said ratchet wheel for preventing rotation of the latter in one direction, and interengaging means on said clutch shaft and hand wheel shaft respectively for limiting the extent of threaded reception of the end of the clutch shaft in said internally threaded socket.

2. A hand brake mechanism for operating the brake shoes of a railway car, comprising a chain adapted to be operatively connected to said brake shoes, a drum shaft mounted for rotation about a horizontal axis, a drum mounted on said drum shaft and rotatable therewith, said chain passing over said drum in one direction for tightening the brake shoes and in the other direction for releasing said brake shoes, a gear on said drum shaft and rotatable therewith, a hand wheel shaft mounted for rotation about a horizontal axis parallel to and spaced from the drum axis, a hand wheel fixedly secured to said hand wheel shaft, a clutch shaft coaxial with said hand wheel shaft, one end of said hand wheel shaft being provided with a relatively deep socket therein having a truly cylindrical pilot portion and an internal threaded portion, one end of said clutch shaft projecting into said socket and having a distal cylindrical pilot stem portion operatively piloted in said pilot portion of the socket and an externally threaded portion in threaded engagement with the internally threaded portion of the socket, said clutch shaft being shiftable axially relative to the hand wheel shaft upon relative rotation between the hand wheel shaft and clutch shaft, said clutch shaft being formed with a radial flange having a forwardly facing friction surface thereon, said hand wheel shaft being formed with a radial flange having a rearwardly facing friction surface in opposition to said friction surface on the clutch shaft, a ratchet wheel interposed between said friction surfaces, a clutch plate interposed between said ratchet wheel and each of said friction surfaces, a pinion on said clutch shaft meshing with said gear on the drum shaft, a pawl cooperating with said ratchet wheel for preventing rotation of the latter in one direction, an abutment on said hand wheel shaft, and a pin projecting through said radial flange on the clutch shaft, said abutment being positioned in the path of movement of said pin for limiting the extent of relative turning movement between the clutch shaft and the hand wheel shaft.

3. A hand brake mechanism of the character described, a housing including front and rear spaced vertical walls, the lower region of said front wall being inwardly offset toward the rear wall, said walls thus defining therebetween a relatively wide upper space and a relatively narrow lower space, a hand wheel shaft rotatably journalled in the upper region of said front wall and projecting into said relatively wide upper space, a hand wheel fixedly mounted on said hand wheel shaft exteriorly of the housing, the rear end of said hand wheel shaft being formed with a relatively deep socket therein having an internally threaded wall, a clutch shaft having its rear end rotatably journalled in said rear wall and having its forward end projecting into said socket and threadedly received therein, said clutch shaft extending across said relatively wide upper space, a drum shaft rotatably journalled in said walls below said hand wheel shaft and said clutch shaft, said drum shaft extending across said relatively narrow lower space and projecting through the offset portion of the front wall, a drum mounted on said drum shaft and rotatable therewith, a chain having an end thereof secured to said drum, an interengaging pinion and gear on said clutch shaft and drum shaft respectively and operatively connecting the two shafts in driving relationship, a ratchet wheel rotatable and slidable on said hand wheel shaft, a pawl for preventing rotation of the ratchet wheel in one direction, means preventing axial shifting movement of the hand wheel shaft, cooperating mating threads on the wall of said socket and said forward end of the clutch shaft, means providing a forwardly facing friction surface on said clutch shaft, means providing a rearwardly facing friction surface on said hand wheel shaft spaced from and in opposition to the other friction surface, said ratchet wheel being interposed between said friction surfaces, said clutch shaft being axially slidable within said relatively wide space between a retracted position wherein said forwardly facing friction surface is out of frictional engagement with the ratchet wheel and an advanced position wherein said forwardly facing friction surface engages the ratchet wheel and forces the latter into frictional engagement with said rearwardly facing friction surface, the pitch direction of the threaded connection between said socket wall and the forward end of the clutch shaft being such that the application of torque to the drum shaft incident to forcible unwinding of the chain from said drum will, through the medium of the pinion and gear, impart rotation to the clutch shaft in a direction counter to the direction of rotation of the ratchet wheel.

4. A hand brake mechanism as set forth in claim 3 including, additionally, a friction disk interposed between each of said friction surfaces and said ratchet wheel.

5. A hand brake mechanism as set forth in claim 3 including, additionally, a depending apron formed on said front wall substantially in the vertical plane of the upper region thereof, said apron, in combination with the rearwardly offset portion of the front wall, defining a pocket in which the drum is disposed.

6. A hand brake mechanism as set forth in claim 3 including, additionally, a depending apron formed on said front wall substantially in the verical plane of the upper region thereof, said apron, in combination with the rearwardly offset portion of the front wall, defining a pocket in which the drum is disposed, the forward end of the drum shaft being rotatably journalled in said apron.

7. A hand brake mechanism of the character described, a housing including front and rear spaced vertical walls, the lower region of said front wall being inwardly offset toward the rear wall, said walls thus defining therebetween a relatively wide upper space and a relatively narrow lower space, a hand wheel shaft rotatably journalled in the upper region of said front wall and projecting into said relatively wide upper space, a hand wheel fixedly mounted on said hand wheel shaft exteriorly of the housing, a clutch shaft having its rear end rotatably journalled in said rear wall, pilot means rotatably connecting the forward end of the clutch shaft to the rear end of said hand wheel shaft in coaxial relationship, said clutch shaft extending across said relatively wide upper space, a drum shaft rotatably journalled in said walls below said hand wheel shaft and said clutch shaft, said drum shaft extending across said relatively narrow lower space and projecting through the offset portion of the front wall, a drum mounted on said drum shaft and rotatable therewith, a chain having an end thereof secured to said drum, an interengaging pinion and gear on said clutch shaft and drum shaft respectively and operatively connecting the two shafts in driving relationship, a ratchet wheel rotatable and slidable on said hand wheel shaft, a pawl for preventing rotation of the ratchet wheel in one direction, means preventing axial shifting movement of the hand wheel shaft, cooperating mating threads on the wall of said socket and said forward end of the clutch shaft, means providing a forwardly facing friction surface on said clutch shaft, means providing a rearwardly facing friction surface on said hand wheel shaft spaced from and in opposition to the other friction surface, said ratchet wheel being interposed between said friction surfaces, said clutch shaft being axially slidable within said relatively wide space between a retracted position wherein said forwardly facing friction surface is out of frictional engagement with the ratchet wheel and an advanced position wherein said forwardly facing friction surface engages the ratchet wheel and forces the latter into frictional engagement with said rearwardly facing friction surface, the pitch direction of the threaded connection between said socket wall and the forward end of the clutch shaft being such that the application of torque to the drum shaft incident to forcible unwinding of the chain from said drum will, through the medium of the pinion and gear, impart rotation to the clutch shaft in a direction counter to the direction of rotation of the ratchet wheel.

References Cited in the file of this patent

UNITED STATES PATENTS

| | | |
|---|---|---|
| 2,280,180 | Van Cleave | Apr. 21, 1942 |
| 2,313,602 | Van Cleave | Mar. 9, 1943 |
| 2,685,213 | O'Connor | Aug. 3, 1954 |
| 2,905,292 | Bretz | Sept. 22, 1959 |